United States Patent
Tartter et al.

[15] 3,682,979

[45] Aug. 8, 1972

[54] DYE NITRATES

[72] Inventors: Arnold Tartter, Lambsheim; Guenter Riedel, Mannheim; Eberhard Nold, Ludwigshafen, all of Germany

[73] Assignee: Badische Anilin- & Soda-Fabrik Aktiengesellschaft, Ludwigshafen/Rhine, Germany

[22] Filed: May 18, 1970

[21] Appl. No.: 38,515

[30] Foreign Application Priority Data

May 21, 1969 Germany..........P 19 25 811.8

[52] U.S. Cl. .................................260/393
[51] Int. Cl. ...........................................C09b 11/12
[58] Field of Search.......................260/393

[56] References Cited

UNITED STATES PATENTS 3,535,347    10/1970    Bitterli......................260/393

OTHER PUBLICATIONS

Moeller, " Inorganic Chemistry," 1952, pp. 463– 464.

Primary Examiner—Lewis Gotts
Assistant Examiner—R. S. Weissberg
Attorney—Johnston, Root, O'Keeffe, Keil, Thompson & Shurtleff

[57] ABSTRACT

Nitrates of triarylmethane dyes useful in printing inks, pastes for ball point pens, inks, copying papers, transparent coatings, etc.

1 Claim, No Drawings

DYE NITRATES

The invention relates to the dyes having the formulae (I) and (II):

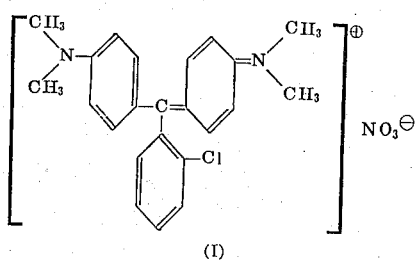

(I)

and

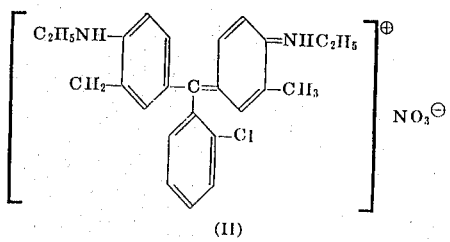

(II)

and their use for the production of printing inks, pastes for ball point pens, copying papers, hectographic papers, stamping and other inks and transparent coatings.

The new dyes may be prepared for example by double decomposition or by reaction of the Rhodulin dye base with nitric acid.

The dyes known under the names "RHODULIN BLUE 6G" or "SETOGLAUCIN 0" (C. I. 42 025, cation of formula (I)) and "RHODULIN BLUE 5B" or "SETOCYANINE 0" (C. I. 42 140, cation of formula (II)) are hydrochloric acid salts of 2''-chloro-4,4'-bisdimethylaminotriphenylcarbinol and 2''-chloro-3,3'-bismethyl-4,4'-bisethylaminotriphenylcarbinol. It is advantageous to use these chlorides, which may also be present in the form of double salts with zinc chloride, or another soluble salt as the starting material for the production of the nitrates. Examples of water-soluble nitrates which are suitable for double decomposition with the RHODULIN dye salts are the alkali metal nitrates or alkaline earth metal nitrates such as sodium nitrate, potassium nitrate or calcium nitrate, or ammonium nitrate.

In the reaction of RHODULIN dye bases with nitric acid, the latter is preferably used as a dilute acid. It may also be advantageous to add nitric acid in the double decomposition of RHODULIN dye salts with nitrates.

The new dyes are distinguished by very good solubility in organic solvents such as alcohols, glycols and glycol ethers. They are therefore eminently suitable for the production of copying papers, hectographic papers, stamping, marking and other inks, transparent coatings, and particularly for printing inks such as glycol and flexographic printing inks, and pastes for ball point pens. It is also possible to use them together with spirit-soluble binders, for example in transparent coatings.

Products prepared with the dye nitrates are surprisingly very much less corrosive than products prepared with the commercial chlorides or the zinc chloride double salts described in the literature. The low tendency to corrosion is important where the dye will come into contact with metals.

As compared with the commercial chlorides, the new nitrates moreover have the advantageous property of crystallizing better and more rapidly. This makes possible a less troublesome and more rapid production of RHODULIN BLUE and permits better utilization of capacity because in the synthesis the basic dye is isolated direct as the nitrate. The nitrates are moreover in a concentrated form and practically devoid of salt and are soluble in organic solvents without any residue. The problem of waste disposal which is otherwise very critical in the case of dyes is easier to solve because of the low water-solubility of the nitrates.

The invention is illustrated by the following examples in which parts and percentages are by weight unless otherwise specified.

EXAMPLE 1

A solution of 60 parts of potassium nitrate in 150 parts of hot water is added at 65° C while stirring to a solution of 110 parts of the zinc chloride double salts of RHODULIN BLUE 6G in 2,000 parts of hot water. The deposited dye changes after a short residence time into a well crystallized form and may be isolated immediately or after cooling by filtration or suction filtration. 86 parts of RHODULIN BLUE 6G nitrate of the formula (I) above is thus obtained.

EXAMPLE 2

140 parts of RHODULIN BLUE 6G concentrated in the form of the salt-containing hydrochloric acid salt is dissolved in 2,200 parts of water at 60° C. While stirring, a solution of 44 parts of sodium nitrate in 1,000 parts of water is gradually added. The dye, which at first is in a somewhat gelatinous form, crystallizes completely in a sort time at 55° to 60° C and after only about one hour can be cooled and isolated. The dye may be suction filtered very easily and rapidly and can be sucked practically dry on the suction filter so that afterdrying by heating can be dispensed with. The yield of the bronzy, green glistening RHODULIN BLUE 6G nitrate is about 100 parts.

RHODULIN 5B (hydrochloride) can be converted into the corresponding nitrate of the formula (II) above in an analogous manner.

EXAMPLE 3

130 parts of RHODULIN BLUE 6G zinc chloride double salt is stirred in 2,000 parts of water and 250 parts of 25 percent ammonia solution for 2 hours at room temperature, then for an hour while heating at 60° C and is then allowed to cool. The dye base obtained is suction filtered and washed with dilute ammonia solution until it is freed from zinc. The base is then suspended in 3,000 parts of water at 70° to 75° C and 64 parts of 32.5 percent nitric acid is added so that a pH of 1.7 is achieved; the hot solution is filtered and allowed to cool. The deposited crystals are suction filtered, washed with water and dried. 90 parts of particularly pure RHODULIN BLUE 6G nitrate having high tinctorial strength is obtained.

3
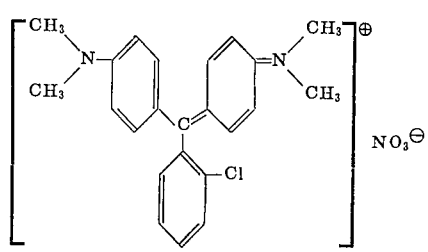
and
4
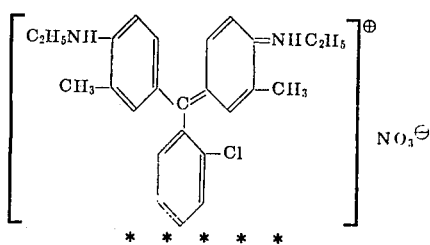

We claim:

1. A dye selected from the class consisting of dyes having the formulas:-